United States Patent
Kulhavy et al.

[11] Patent Number: 5,848,781
[45] Date of Patent: *Dec. 15, 1998

[54] BALANCING HOIST BRAKING SYSTEM

[75] Inventors: Joseph A. Kulhavy, Southfield; Timothy G. Wamboldt, Rochester Hills, both of Mich.

[73] Assignee: Ingersoll-Rand Company, Woodcliff Lake, N.J.

[ * ] Notice: The term of this patent shall not extend beyond the expiration date of Pat. No. 5,522,581.

[21] Appl. No.: 845,981

[22] Filed: May 1, 1997

Related U.S. Application Data

[63] Continuation of Ser. No. 386,500, Feb. 10, 1995, abandoned, which is a continuation-in-part of Ser. No. 182,785, Jan. 13, 1994, Pat. No. 5,522,581.

[51] Int. Cl.⁶ ..................................................... B66D 1/10
[52] U.S. Cl. ......................... 254/360; 254/379; 188/170; 188/185; 188/187
[58] Field of Search ...................................... 254/360, 379, 254/378, 368, 270; 188/170, 70 R, 185, 187

[56] References Cited

U.S. PATENT DOCUMENTS

| | | | |
|---|---|---|---|
| 2,181,359 | 11/1939 | Barrett | 254/173 |
| 2,665,111 | 1/1954 | Sokolik | 254/157 |
| 2,710,107 | 6/1955 | Powell | 214/658 |
| 2,896,912 | 7/1959 | Faugier et al. | 254/159 |
| 3,260,508 | 7/1966 | Powell | 254/168 |
| 3,261,477 | 7/1966 | Powell | 212/134 |
| 3,276,747 | 10/1966 | Zimmerman | 254/173 |
| 3,286,989 | 11/1966 | Bangerter et al. | 254/168 |
| 3,325,148 | 6/1967 | Powell | 254/186 |
| 3,333,821 | 8/1967 | Pohl et al. | 254/150 |
| 3,368,796 | 2/1968 | Ulbing | 254/168 |
| 3,384,350 | 5/1968 | Powell | 254/172 |
| 3,421,737 | 1/1969 | Ulbing | 254/186 |
| 3,428,298 | 2/1969 | Powell | 254/168 |
| 3,450,428 | 6/1969 | Zimmerman | 294/82 |
| 3,457,837 | 7/1969 | Powell | 91/447 |
| 3,481,582 | 12/1969 | Ulbing | 254/167 |
| 3,481,583 | 12/1969 | Ulbing | 254/168 |
| 3,491,427 | 1/1970 | Zimmerman | 29/240 |
| 3,526,388 | 9/1970 | Geiger et al. | 254/168 |
| 3,621,756 | 11/1971 | Ulbing | 91/43 |
| 3,635,442 | 1/1972 | Ulbing | 254/168 |
| 3,656,715 | 4/1972 | Powell | 254/168 |
| 3,822,768 | 7/1974 | Sebulke | 188/70 R |
| 4,053,036 | 10/1977 | Branham et al. | 188/70 X |
| 4,545,567 | 10/1985 | Telford et al. | 254/378 X |
| 4,856,623 | 8/1989 | Romig, Jr. | 188/187 X |
| 5,432,000 | 7/1995 | Braesch et al. | 254/360 |
| 5,522,581 | 6/1996 | Kulhavy | 254/360 X |
| 5,671,912 | 9/1997 | Langford et al. | 254/267 |

FOREIGN PATENT DOCUMENTS

| | | | |
|---|---|---|---|
| 35148 | 1/1965 | Germany | 254/368 |
| 92337 | 8/1958 | Norway | 254/368 |

*Primary Examiner*—Donald P. Walsh
*Assistant Examiner*—Emmanuel M. Marcelo
*Attorney, Agent, or Firm*—Leon Nigohosian, Jr.; Alan R. Thiele

[57] ABSTRACT

A pneumatically operated balancing hoist includes a housing forming a gas chamber, an inlet for communicating with the gas chamber, a sliding piston, and a rotatable longitudinally movable cable drum. The rotatable longitudinally movable cable drum contains one or more longitudinal openings which slidably accommodate drive rods. The drive rods impart the rotation of the cable drum to a flywheel. Exterior to the flywheel are rotating brake shoes which contact a stationary braking surface when the rotation of the longitudinally movable cable drum exceeds a predetermined angular acceleration. A conically shaped brake system attached to the flywheel is mechanically engaged to prevent rotation of the cable drum until pressurized gas is supplied to the chamber.

10 Claims, 17 Drawing Sheets

BALANCING HOIST BRAKING SYSTEM

This application is a continuation of Ser. No. 08/386,500, filed Feb. 10, 1995, ABN, which is a continuation-in-part of U.S. patent application Ser. No. 08/182,785, filed Jan. 13, 1994 now U.S. Pat. No. 5,522,581.

BACKGROUND

This invention relates to a pneumatically operated hoist and particularly to a hoist with a braking mechanism for quickly stopping the movement of the cable of such hoist in the event of a sudden change in the load held by the hoist or the loss of the pressurized air or gas used to operate the hoist. This hoist includes a braking mechanism that compensates for sudden acceleration of loads carried by the hoist or the sudden changes in such loads.

Pneumatic balancing hoists are well established as a standard in the materials handling industry. These pneumatic balancing hoists or air balancers, have been used to move work pieces about a factory or industrial site. A problem may occur, however, when the hook connected to the cable of the hoist suddenly has a change in its load. As a result of such change in load, for example, when the load is suddenly dropped, the force of the load pulling down on the cable and hook are suddenly no longer present to balance the air pressure contained in the air balancer. This imbalance of forces causes a dangerous condition where the cable and hook are pulled up abruptly. In the industry, such condition has become known as the "flying hook problem." In short, a braking means for preventing the cable from being pulled up abruptly or with a start has long been desired in the industry. The braking mechanism of the present invention avoids the problem not solved in the prior art that is posed by the longitudinal or axial movement of the drum used in such hoists by eliminating the axial movement from the braking surfaces such that only radial forces are involved in the braking mechanism.

A number of different variations in the design of such pneumatically operated hoists exist; such as can be seen U.S. Pat. Nos. 2,710,107, and related designs in U.S. Pat. Nos. 3,324,148 and 3,384,350, which feature a housing with an air chamber for causing the rotation of a cable drum as a nut about a stationary ball screw, with a cable rotating on the cable drum at one end and connected to a load on its other end. Air is supplied to the chamber by way of an inlet from a source of pressurized air with various means for controlling the supply of air as shown in U.S. Pat. No. 3,325,148. Each of these earlier patents is incorporated by reference for all purposes into this application. Another design of pneumatically operated hoists can be seen in U.S. Pat. Nos. 3,286,989 and 3,421,737, which are incorporated herein by reference. These two patents describe systems which employ an air chamber for causing rotation of a cable drum inside a cylindrical bore of a housing through the use of rollers inside the cable drum. Again, the cable drum rotates and moves longitudinally as the cable unwinds or winds with the movement of a load.

Prior art approaches to a braking mechanism for a balancing hoist have not resolved the problem of the dangerous condition that occurs when the load suddenly is removed from the hoist. One approach has been to control the movement of the cable by controlling the air pressure counter-balancing the load. Also, to prevent the rapid movement of the cable and load in the event of a loss of pressure in the air pressure chamber, various control mechanisms have been designed to address the sudden loss of air pressure. The designs that address the control of the air pressure supplied to balancing hoists, however, have the drawback of being too slow in their response as it takes too long to adjust the air pressure to prevent the rapid movement of the cable and hook when a load has been dropped.

Another approach to preventing the rapid movement of the cable and hook when a load has been dropped has been to employ a braking device on the outside of the cable drum which is activated by centrifugal force once the speed of the rotation of the cable drum reaches a certain rotational speed. This design can be seen in U.S. Pat. Nos. 2,710,107 and 3,286,989. Each of these two patents discloses some braking means on the outside of the cable drum that is both rotating and moving longitudinally. The problem with each of these designs is that the braking mechanisms are unreliable because they must necessarily stop the rotational movement of the cable drum while the cable drum is moving longitudinally. As a result of this longitudinal movement of the cable drum, it has been found that the braking mechanism is inherently unreliable. One braking mechanism in the prior art did attempt to avoid the problems associated with the longitudinal movement of the rotating cable drum. In U.S. Pat. No. 3,276,747, a safety device for rotatable members is disclosed that employs a plurality of pivotable dogs mounted to rotate with the cable drum. This approach, however, has been unworkable primarily because of the locking of the braking mechanism, but also because of the difficulty of installing such a design in a pneumatically operated hoist employing a rotating cable drum which rotates within a housing such as disclosed and claimed herein.

SUMMARY

One object of the present invention is to provide a means for braking the rotation of the cable drum in the event that the rotational speed of the cable drum exceeds a predetermined, safe maximum rotational speed after a sudden change in the load on the hoist cable.

Another object of the invention is to provide a means for braking the rotation of the cable drum to prevent the cable drum from accelerating at an excessive rate after a sudden change in the load on the hoist cable.

Yet another object is to provide a material handling system which is usable with an overhead rail system incorporating this braking mechanism for a balancing hoist.

Still another object of this invention is to provide such a braking mechanism that is simple, adds few additional parts to a balancing hoist, and can be easily manufactured as well as easily adapted to existing balancing hoists that do not incorporate the invention.

Thus, the principle object of this invention is to provide a new and improved design for a braking mechanism in balancing hoists which substantially eliminates or minimizes the disadvantages of the prior art braking mechanisms used in earlier balancing hoists.

The new braking mechanism of the present invention resolves the problems of stopping the rotation of a longitudinally moving rotatable cable drum by locating a braking means on a separate non-longitudinally moving rotational means that is connected to the cable drum such that only the rotational forces of the cable drum are translated to such non-longitudinally moving rotational means. This is done by connecting the cable drum and rotational means by way of one or more rods or other driving means that are on one end slidably inserted into one or more openings in the cable drum and on the other end affixed to a plate mounted on the housing. As the cable drum rotates within a housing on a fixed stationary screw, for example, the rotating cable drum slides longitudinally along the rod or rods which rotate with the cable drum. The rods impart rotational movement to the non-longitudinally moving rotating means on one end of the housing. The non-longitudinally moving rotational means is equipped with a braking mechanism that is actuated once the actual speed of the rotational means or the centrifugal force associated with such rotation reach certain predetermined values. A braking mechanism, such as a rotating brake shoe, is moved by centrifugal force against a stationary braking surface on the interior of the housing. One principle advantage of such a design is that the stationary braking surface on the interior of the housing is at a predetermined location on the inside of the housing, rather than at a number of different possible locations over the length of the longitudinal movement of the rotatable cable drum, which is necessarily the case when the braking mechanism must be functional at all longitudinal locations of the rotating cable drum.

Various braking designs that add to the centrifugal braking associated with the rotation of the rotatable cable drum can be easily included with the preferred embodiment disclosed herein. Two examples of such braking designs are shown in the first and second alternate embodiments. In the first embodiment, the system of the present invention allows for the addition of a positive mechanical lock which restricts the rotation of the cable drum. In the second alternate embodiment, a rotating conical brake shoe allows the system to be used either as a balancing hoist or as a regular hoist.

The system of the present invention can also be employed with different types of balancing hoists besides the one disclosed in the preferred embodiment which is described herein. For example, in the balancing hoists that employ a rotating cable drum moving longitudinally within a cylindrical bore inside the housing, this design of braking mechanism can easily be adapted and employed as is readily apparent.

Numerous other objects and advantages of the invention will be apparent from the following detailed description of the various embodiment thereof, reference being made to the accompanying drawings.

DESCRIPTION OF THE EMBODIMENTS

Figure 1:
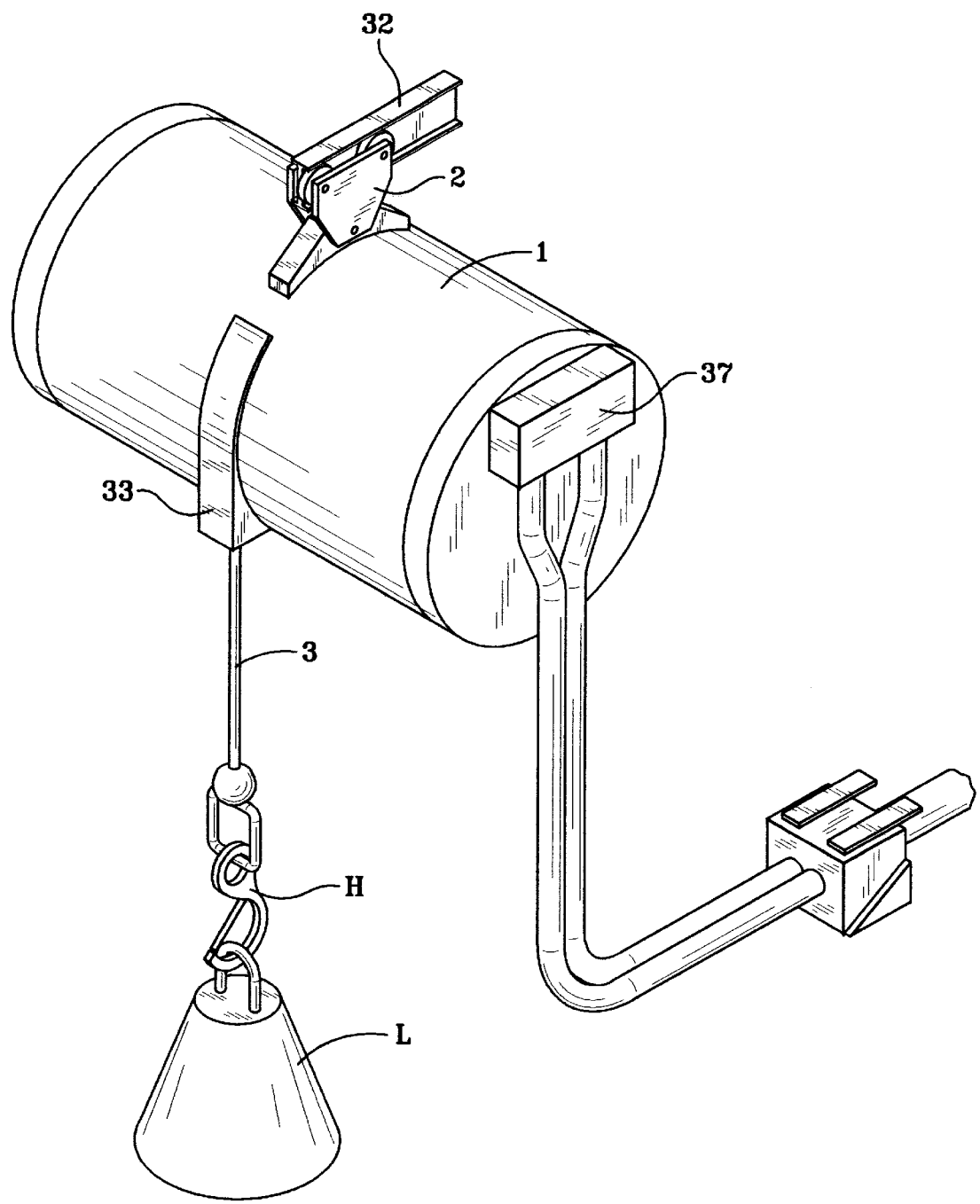
FIG. 1 is an overall perspective view of a balancing hoist system according to the invention shown supporting a load.

Referring to the drawings, and more particularly to FIG. 1, a pneumatically operated balancing hoist 1 embodying the invention is supported from an overhead rail 32 by hoist trolley 2. Extending from the hoist 1 downward is a lifting cable or chain 3 that passes through a guide 33. The lifting cable or chain 3 can be fitted with various types of hooking mechanisms H for attaching a load L for movement. The movement of a load L with such a pneumatically-operated hoist is well-known in the art. It should be noted that the balancing hoist 1 could also be supported by a stationary mounting as well. Inlet manifold 37 allows for the passage of pressurized gases into and out of the hoist 1.

Figure 2:
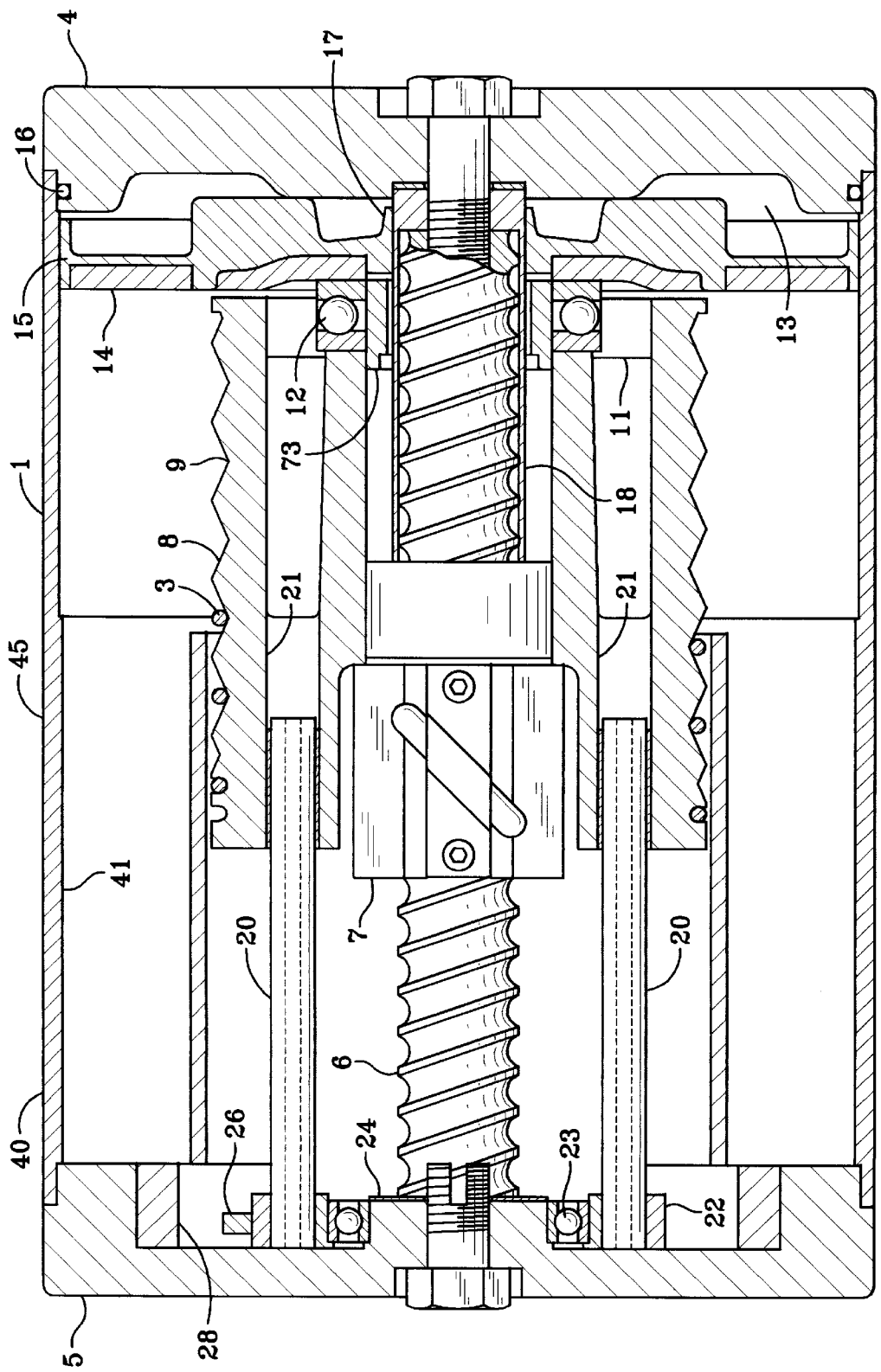
FIG. 2 is a cross-sectional view of the balancing hoist.
Figure 3:
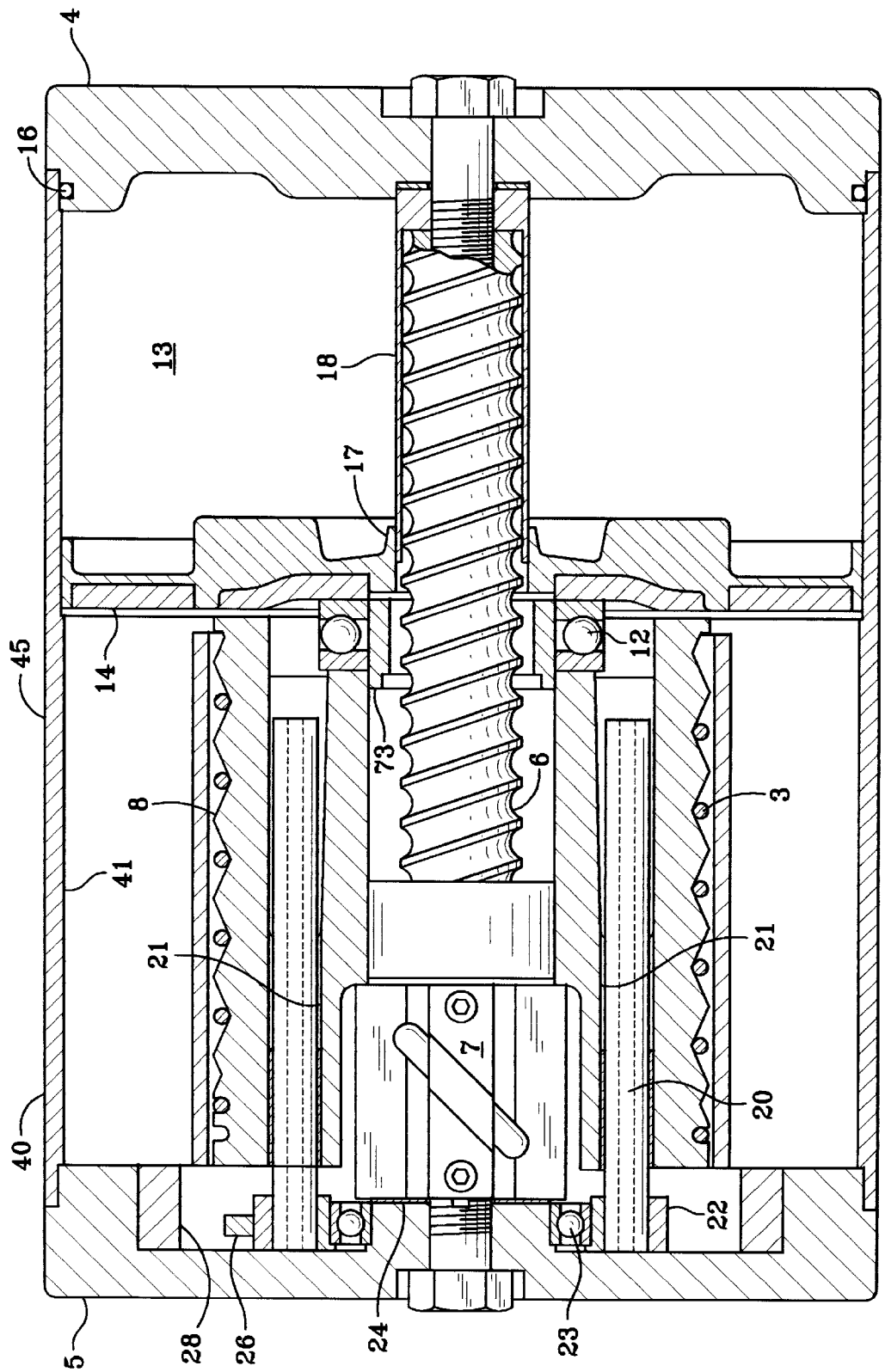
FIG. 3 is the same cross-sectional view of the hoist, the view disclosing the operative elements thereof in positions different from those shown in FIG. 2.

Referring to FIGS. 2 and 3, the hoist 1 includes a housing 40 having end walls 4 and 5 and a hollow cylindrical casing 45 therebetween. An O-ring 16 assures a gas-tight connection between the end wall 4 and the cylindrical casing 45. A ball screw 6 extends longitudinally through the housing 40 and is connected at each of the housing 40 centrally to the end walls 4 and 5. A ball screw assembly 7 is mounted on the ball screw 6 and moves longitudinally within the housing 40 when turned relative to the ball screw 6. Ball screw assemblies 7 of this nature are well-known in the art and will not be discussed in detail.

A rotating cable drum 8 is mounted on the ball screw assembly 7 and moves on the ball screw 6 both rotatably and longitudinally relative to the ball screw 6. The rotating cable drum 8 has a shallow helical groove 9 that receives the lifting cable or chain 3 when the load L is raised and the cable 3 is wound on the rotating cable drum 8. One end of the lifting cable or chain 3 is suitably affixed to the rotating cable drum 8 at one end of the helical groove 9. As the cable drum 8 moves rotatably and longitudinally within the housing 40, the lifting cable or chain 3 is wound or unwound about the rotating cable drum 8 for raising and lowering loads. Whether the lifting cable or chain 3 is wound or unwound will obviously depend on the direction of the movement of the load being up or down. The lifting cable or chain 3 passes through a guide 33 (FIG. 1) to the various types of hooking mechanisms used for attaching to a load L for movement.

A thrust bearing 12 is located adjacent to the rotating cable drum 8 and bears against a hub portion 11 of the rotating cable drum 8. The thrust bearing 12, mounted on an extension 73 of the rotating cable drum 8, is arranged to bear against a piston 14. The piston 14 has a peripheral seal 15 which engages and slides on the inner surface 41 of the housing 40 so as to tightly seal the gas in a chamber formed within the housing 40. In this fashion, the second end wall 4, the right-hand portion of the cylindrical casing 45, and the piston 14 form a chamber 16 within the housing 40 to receive gas for operating the hoist 1. The piston 14 has an inner diameter lip seal 17 that is in slidable but sealing contact with a sleeve 18 over the right end of the ball screw 6.

When pressurized gas is supplied to the chamber 16 air usually being used, the piston 14 is moved longitudinally toward the left through the housing 40 and, through the thrust bearing 12, forces the rotatable cable drum 8 and the ball screw assembly 7 in the same longitudinal direction from right to left as shown in FIGS. 2 and 3. During this longitudinal movement of the piston 14, the ball screw assembly 7 also causes the cable drum 8 to rotate in a manner to raise and lower the cable 3 and the load L. The flow of pressurized gas supplied to the chamber 13 can be controlled in various ways that are well known in the art and will not be discussed in detail.

Referring now to FIGS. 2 and 3, to effect the rotational movement of a non-longitudinally moving rotational means 22 displaced away and apart from the rotating cable drum 8 at end wall 5, two drive rods 20 are slidably inserted into two openings 21 within the rotating cable drum 8 that are located longitudinally parallel to the axis of rotation of cable drum 8. One or more drive rods 20 and longitudinal openings 21 can be employed. In the preferred embodiment disclosed herein, two such openings 21 that are of sufficient length and diameter to ensure a stable and reliable rotation of the drive rods 20 as the lifting cable drum 8 rotates with the movement of the cable or chain 3 and, in turn, the movement of the load L.

Figure 4:
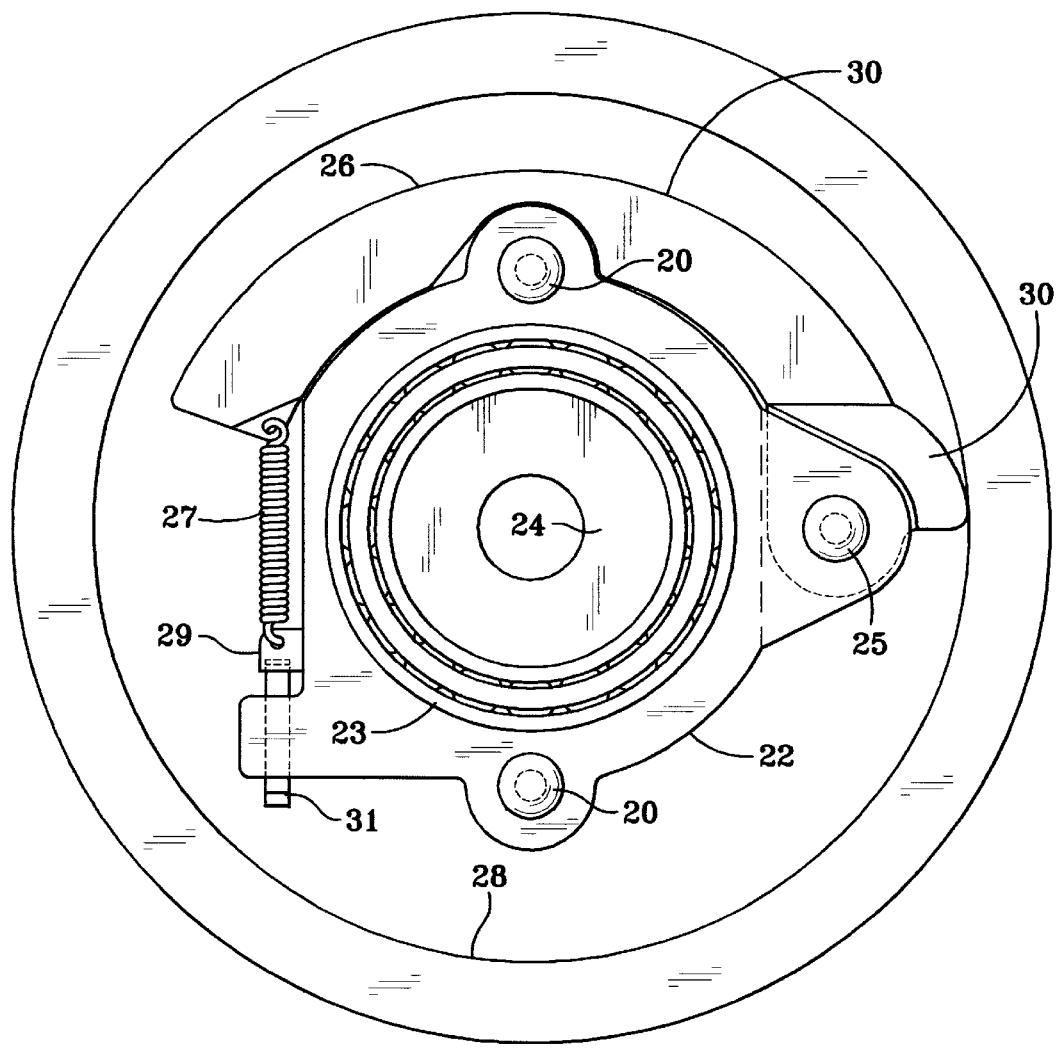
FIG. 4 is an end view of the housing wherein the rotating means and the braking mechanism are located.
Figure 5:
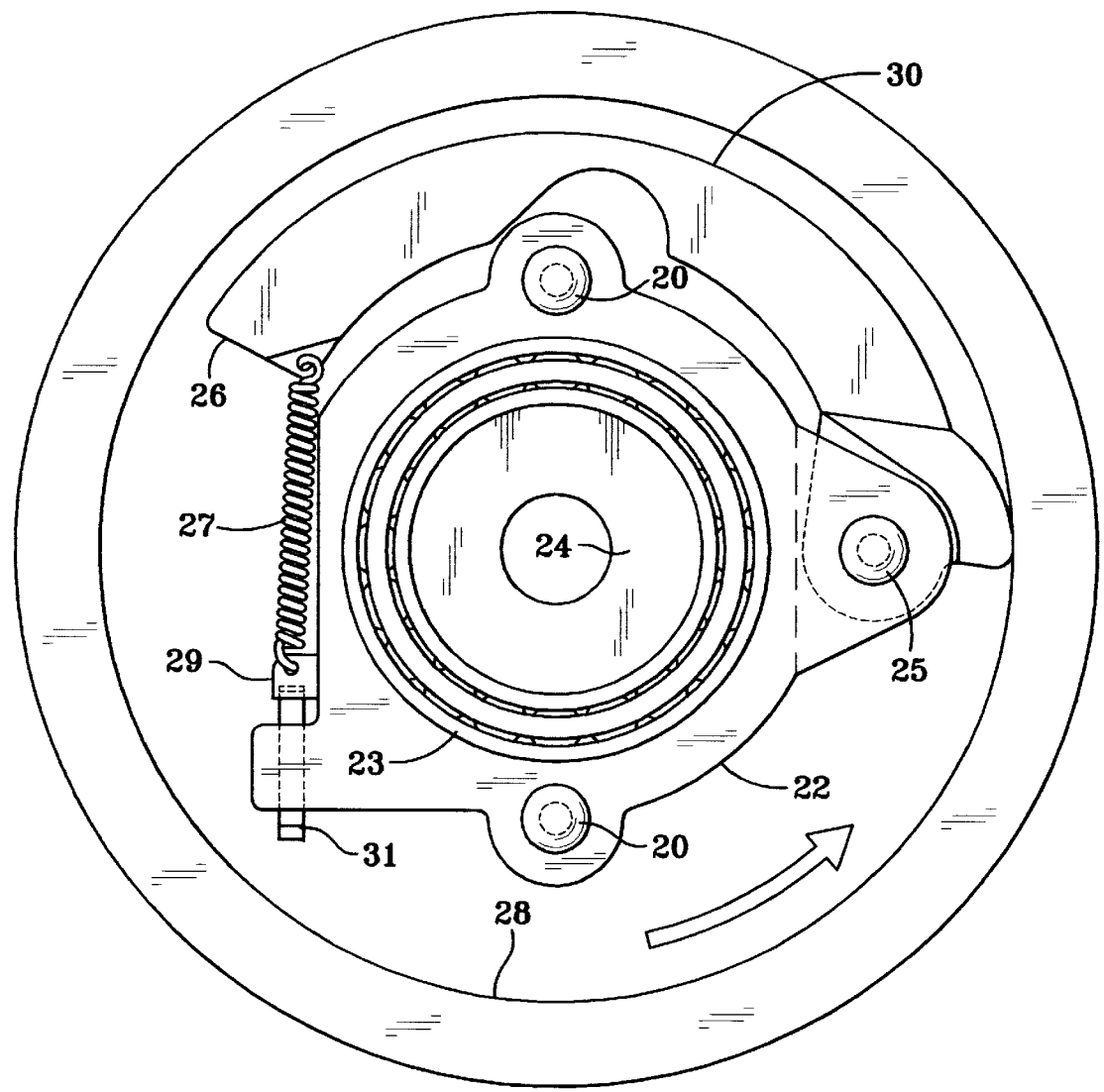
FIG. 5 is the same end view shown in FIG. 4, disclosing the operative elements of thereof in positions different from those shown in FIG. 4.

Referring now to FIGS. 4 and 5, the two drive rods 20 are in turn fixably mounted to the rotational means or flywheel 22. The flywheel 22 is bored for the installation of bearings 23 on a hub 24, which bearings 23 allow for a smooth and controlled rotation of the flywheel 22. At least one rotating brake shoe 26 is pivotably mounted on the flywheel 22 by use of pin 25. In FIGS. 4 and 5, the rotating brake shoe 26 is restrained radially by a biasing means such as spring 27, which spring 27 is connected to the brake shoe 26. (The shape of the rotating brake shoe 26 and the location of the spring 27 can be readily varied so long as the rotating brake shoe 26 properly contacts the stationary braking surface 28.) The spring is similarly attached to the flywheel 22 by a spring anchor 29 and a spring tension adjusting screw 31, which is rotatably fixed to the spring anchor 29 and mounted to the flywheel 22. The tension of the spring 27 can also be adjusted by changing the hole to hole distance for the two ends of the spring 27 by turning adjusting screw 31. The surface 30 of the rotating brake shoe 26 is located adjacent to the interior wall of the end cover 5 that is mounted onto the end of the housing 40. The end cover 5 has been suitably bored and machined at the location of the flywheel 22 to form a stationary braking surface 28 around the entire inner surface of the end cover 5. By locating the stationary braking surface 28 inside the end cover 5 rather than in the housing 40, it is readily apparent that one can undertake a method to retrofit and modify existing balancing hoists to incorporate the claimed invention.

Figure 6:
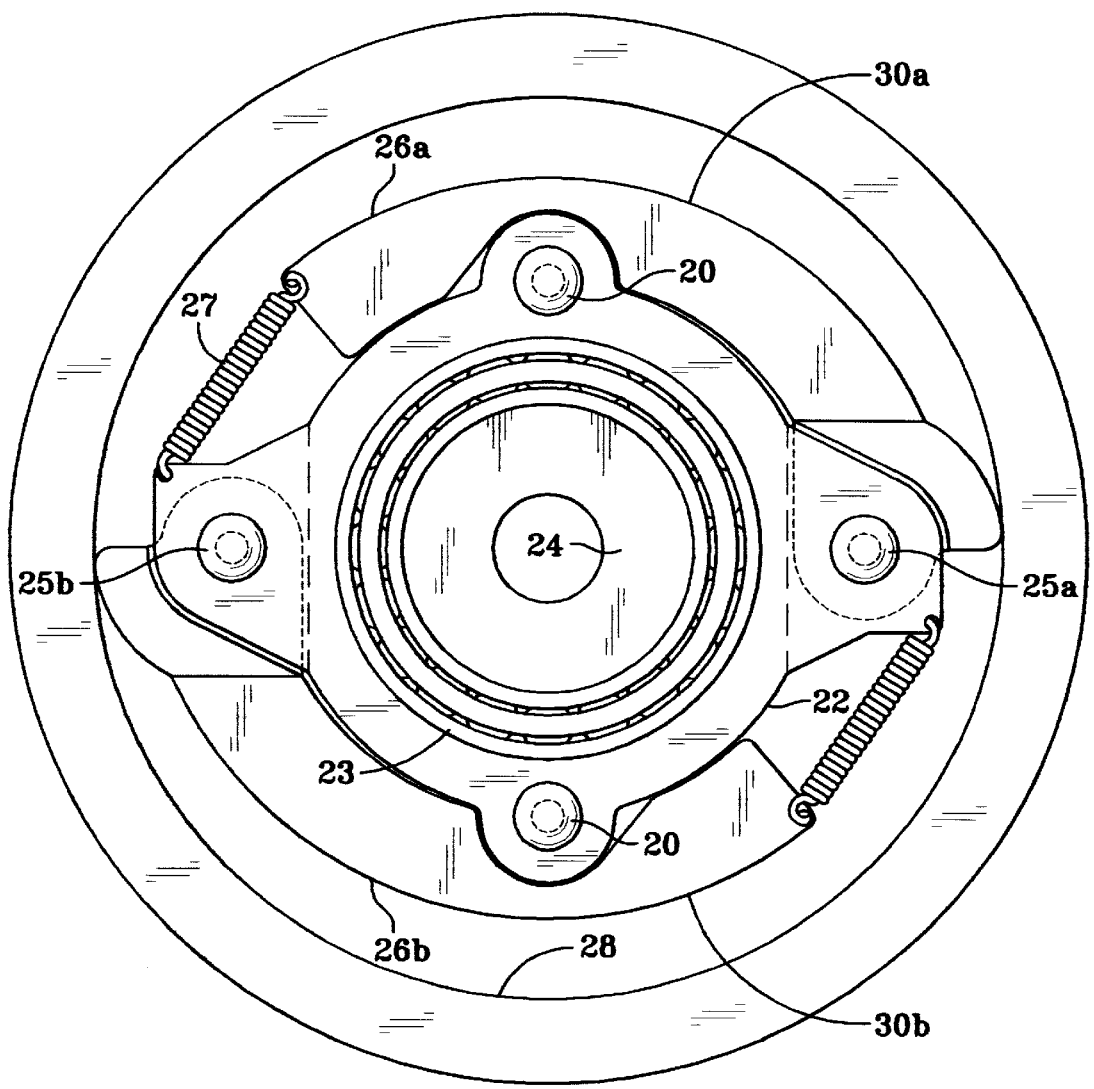
FIG. 6 is a side view of a second embodiment from the end of the housing wherein the rotating means and the braking mechanism are located.

Referring now to FIG. 6, another preferred embodiment employs two rotating brake shoes 26A and 26B which are restrained radially by biasing means such as springs 27, the tension of which can be adjusted as previously disclosed herein. Rotating brake shoes 26A and 26B have outer surfaces 30A and 30B and pivot about pins 25A and 25B. The most advantageous approach for this second preferred embodiment would be to install or connect the second brake shoe 26B to the flywheel 22 directly opposite the first brake shoe 26A, such that the second brake shoe 26B would contact the stationary braking surface 28 directly across from the stationary braking surface 28 contacted by the first brake shoe 26A. The use of two brake shoes 26A and 26B could be employed for an especially large balancing hoist.

When the cable drum 8 rotates below an acceptable rotational speed or angular acceleration, the rotating brake shoe 26 is restrained in a radially inward position (as shown in FIG. 6) by the spring 27. This allows the rotating cable drum 8 to freely turn during routine operation of the hoist 1. When the rotation of the cable drum 8 exceeds a predetermined speed or angular acceleration, however, the centrifugal force which acts on the rotating brake shoe 26 forces the rotating brake shoe 26 radially outward against the spring 27, such that the rotating brake shoe 26 will move toward and eventually contact the stationary braking surface 28 as shown in FIG. 5. Upon contact between the rotating brake shoe 26 and the stationary braking surface 28, the rotating brake shoe 26 becomes wedged against the stationary braking surface 28 as the rotating brake shoe 26 will pivot around pin 25 into a braking position, the rotating brake shoe 26 functioning as a self-energizing brake. At this point, the cable drum 8 will stop rotating and the lifting cable or chain 3 will similarly stop its uncontrolled movement. Similarly, whe the mass of the rotating brake shoe 26 which resists angular acceleration of the cable drum 8 is accelerated by the rotating cable drum 8 above the desired maximum angular acceleration rate, the rotating brake shoe 26 will pivot about the pin 25 out of a generally radial plane of movement (as shown in FIG. 5) until the rotating brake shoe 26 eventually contacts the stationary braking surface 28. Again, once the rotating brake shoe 26 engages the stationary braking surface 28, the rotating brake shoe 26 will become wedged against the stationary braking surface 28 by the centrifugal force resulting from the acceleration of the rotatable cable drum 8 and the braking mechanism will bring the rotating cable drum 8 quickly to a halt. The rotational speed at which the rotating brake shoe 26 moves radially outwardly to the stationary braking surface 28 to halt the rotating cable drum 8 will depend on the strength of the spring 27. Similarly, the tension of the spring 27 will determine the minimum acceleration that will cause the rotating brake shoe 26 to engage the stationary braking surface 28 and stop the rapid rotation of the cable drum 8. Once the cable drum 8 has stopped rotation, however, the braking mechanism will promptly and easily disengage, thereby allowing the routine operation of the hoist 1.

As noted above, another object of this invention was to develop a braking mechanism that could be easily adapted to existing pneumatically operated balancing hoists. Thus, it is possible to modify existing balancing hoists to incorporate this safety device by removing the existing end cover, and then replacing the cable drum and end cover to incorporate one or more driving rods, a flywheel and the centrifugal braking mechanism described herein.

Additionally, this invention could be employed with other designs of pneumatically operated hoists that do not involve the use of a stationary ball screw but rather the use of a cable drum which rotates and moves longitudinally within a longitudinal bore inside a housing. These designs are disclosed in U.S. Pat. Nos. 3,2286,989 and 3,421,737 and can easily be adapted so as to incorporate the present invention. Specifically, such adaptation could easily be done by inserting one or more drive rods into a identical number of holes in the cable drum of such alternative designs and utilizing the drive rods to turn the flywheel mounted on a shaft, with the shaft located at the opposite end of the housing from the gas chamber. Thus, the flywheel would rotate around the shaft. The braking mechanism would similarly function in this design and in the event of excessive speed or acceleration of the rotating cable drum, one or more rotating brake shoes will contact the stationary braking surface on the inside of the housing, thereby abruptly halting the rotation of the cable drum. The adaption of the invention to this alternative design is readily apparent to one skilled in the art.

Figure 7:
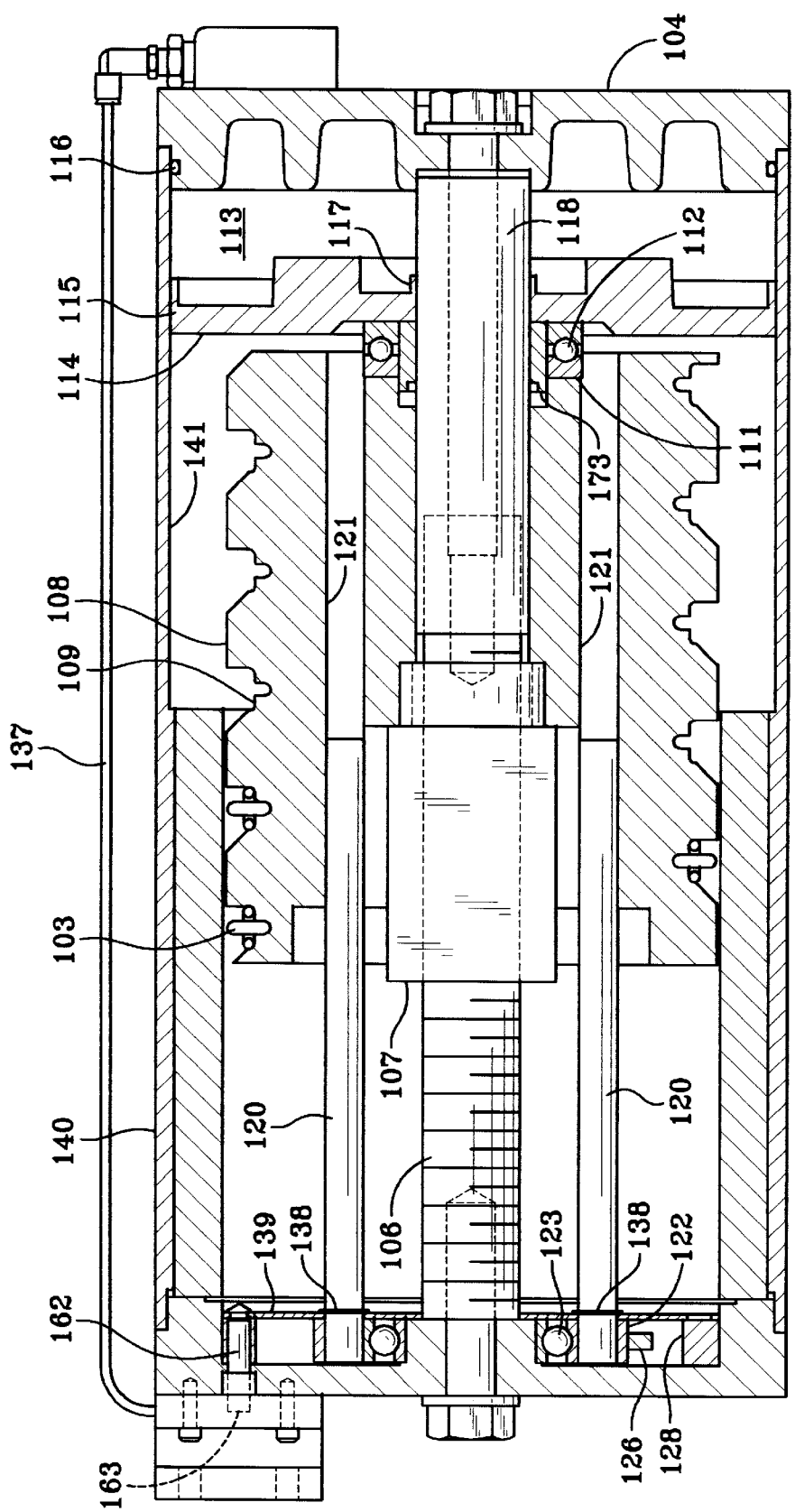
FIG. 7 is a cross-sectional view similar to the cross-sectional view shown in FIG. 2 illustrating a first alternate embodiment.

In the first alternate embodiment shown in FIG. 7 a configuration of parts similar to that shown in FIG. 2 is illustrated. The reference numbers and location of parts are generally the same as in the preferred embodiment except that the number "1" appears in the hundreds place. Specifically, the housing 140 includes an end wall 104 which provides a mounting for the ball screw 106. As in the preferred embodiment, a piston 114 is in sealing contact with the inner wall 141 of the housing 140 to form a chamber 113 for pressurized gas. The pressurized gas causes the piston 114 to move longitudinally within the housing 140. Such longitudinal movement of the piston 114 produces a rotational movement of the drum 108 by the interengagement of the ball screw assembly 107 with the ball screw 106. A thrust bearing 112 provides the interface between the longitudinal motion of the piston 114 and the rotation of the cable drum 108. The rotation of the cable drum 108 causes a winding up of lifting chain or cable 103, as shown in the previous embodiment, around the drum 108 in helical grooves 109.

As in the prior embodiment, the rotational movement of the drum 108 is imparted to the flywheel 122 by drive rods 120 which slide into openings 121 as the rotating drum 108 moves longitudinally through the housing 140. In the case of a dropped load or loss of air pressure, the rotating brake shoe 126 on the outside of the flywheel 122 engages the stationary braking surface 128. However, in the event of a loss of air pressure, the first alternate embodiment provides an additional locking feature which mechanically prevents the drum 108 from rotating.

Figure 7A:
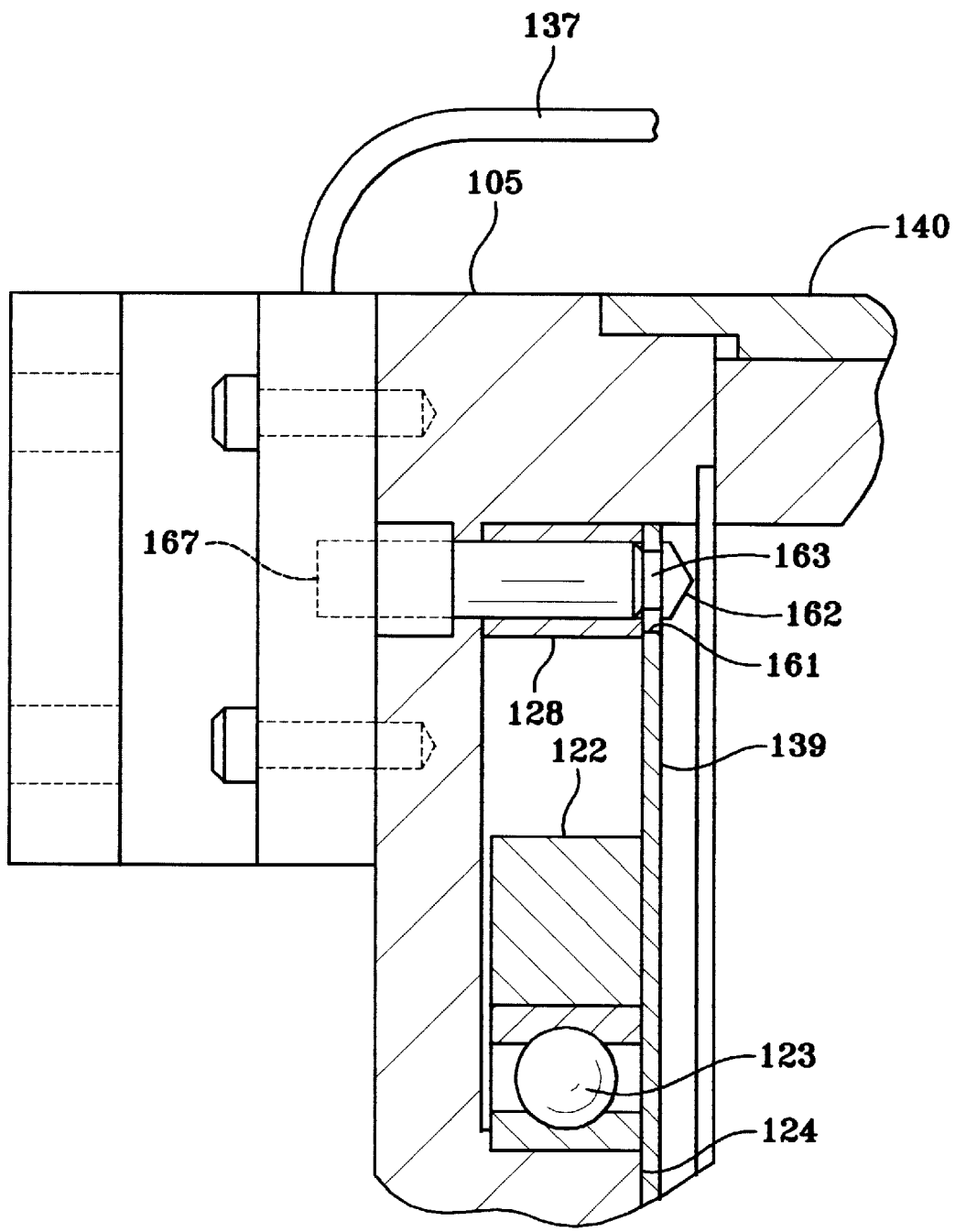
FIG. 7A is an enlarged portion of FIG. 7 showing the engagement of the detent pin with the brake disc.
Figure 7B:
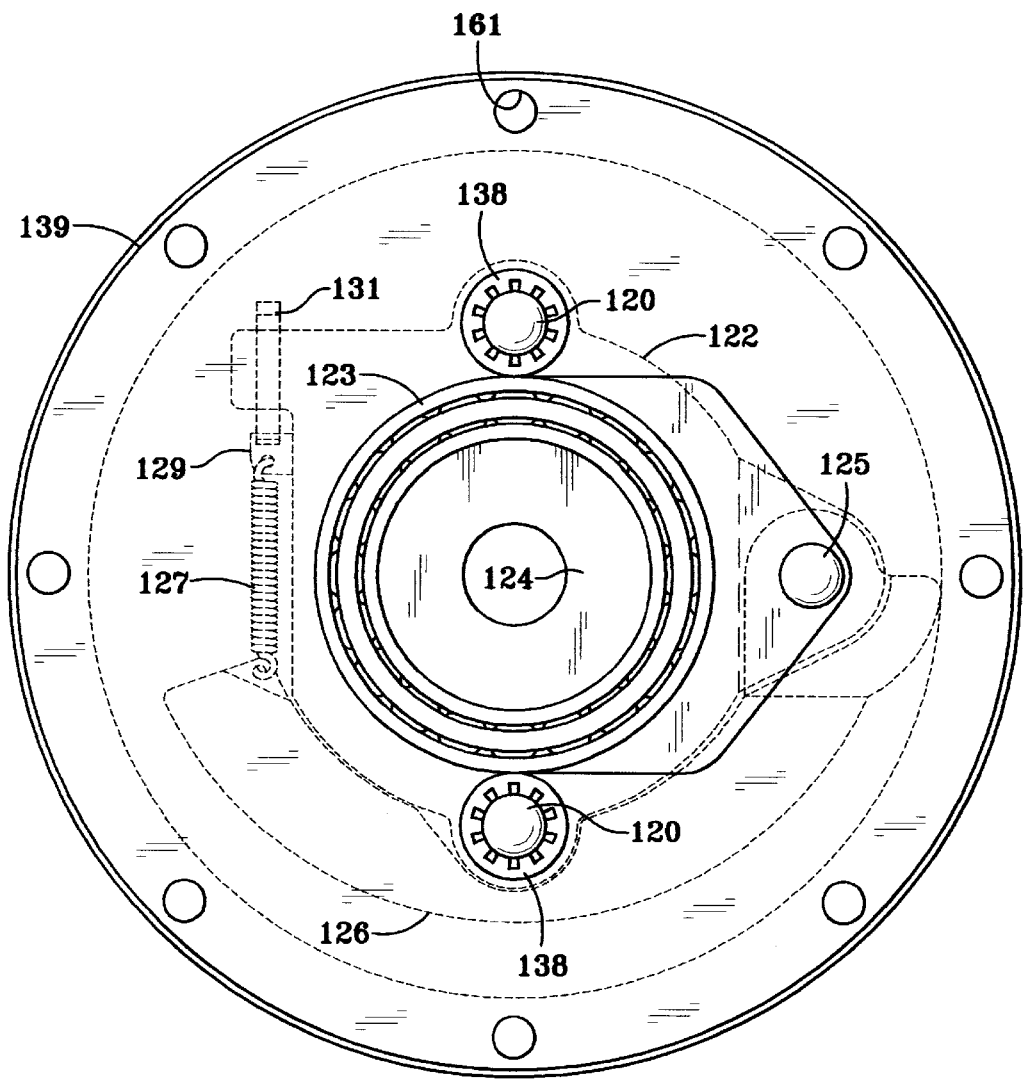
FIG. 7B is an end view similar to FIG. 4 of the embodiment shown in FIG. 7.

As shown in FIG. 7A, brake disc 139 is positioned adjacent to and just inboard of the flywheel or rotational means 122. The brake disc 139 is held in place by retaining rings 138 which engage drive rods 120. As may be best seen in FIG. 7B, the brake disc 139 includes a plurality of detent holes 161 around its outer edge. These detent holes 161 are sized to engage a detent pin 162 which is positioned to pass through a detent hole 161 in the event of a loss of air pressure. Such engagement of the detent pin 162 with one of the detent holes 161 in the brake disc 139 is shown in FIG. 7 and also in FIG. 7A.

Positioning of the detent pin 162 in a retracted position just outside the brake disc 139 is accomplished by using a portion of the pressurized gas used to move the piston 114 through the housing 140. A tube 137 transfers pressurized gas from the back of the piston 114 to the detent pin 162. Such pressurized gas keeps the detent pin 162 in its retracted position. In the event of a loss of air pressure the detent pin 162 is no longer restrained in its retracted position and is moved by a spring 167 toward the brake disc 139. Such movement causes detent pin 162 to pass through one of the the holes 161 in the brake disc 139, thus preventing any further rotation of the cable drum 108.

Positive locking of the brake disc 139 by the detent pin 162 is assured by the utilization of a groove 163 around the detent pin 162. The width of the groove 163 is larger than the thickness of the brake disc 139. Thus, when air pressure is lost and the detent pin 162 engages one of the detent holes 161, the brake disc 139 falls into the groove 163 as shown in FIG. 7A. When air pressure is restored, the detent pin 162 must be retracted back through the detent hole 161 in the brake disc 139. Such retraction requires a slight backward rotation of the brake disc 139 so that the edge of the detent hole 161 is moved out of engagement with the groove 163 in the detent pin 162, thus allowing the detent pin 162 to return to its retracted position against a compressed spring.

Figure 8:
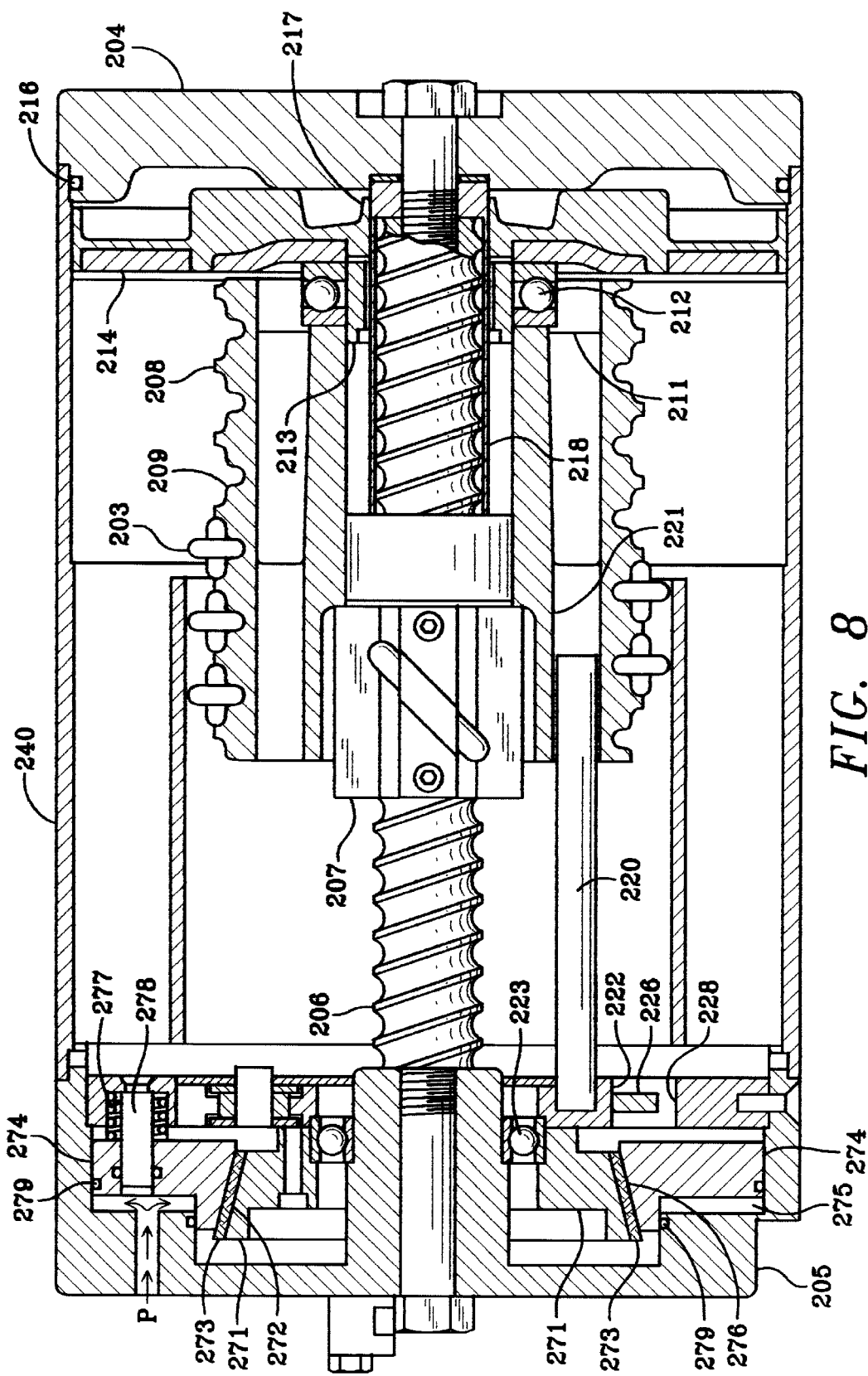
FIG. 8 is a cross-sectional view similar to the cross-sectional view shown in FIG. 2 illustrating a second alternate embodiment.

In FIG. 8, a second alternate embodiment is shown. Parts having similar construction and location have the same reference numbers except for the prefix 2, which appears in the hundreds position of the reference numbers. The operation of the embodiment shown in FIG. 8 is similar to that of the embodiment shown in FIG. 7. Specifically, when there is no gas pressure, the cable drum is locked in position. When air pressure is supplied to move the piston 214 within the housing 240 to cause the cable drum 208 to rotate and wind the lifting cable or chain 203 within the helical grooves 209 around the rotating cable drum 208, the air pressure also causes the locking mechanism which prevents the cable drum 208 from rotating to be released. This action is accomplished by the mounting of a rotating conical brake shoe 271 just outboard of the flywheel 222. The rotating conical brake shoe 271 has a tapered surface 272 which provides a mounting for a pad of friction material 273. Engaging the pad of friction material 273 is a linearly sliding brake piston 274 which is positioned to slide back and forth within a chamber 275. Therefore, when air or gas pressure is supplied to the chamber 275, the linearly sliding brake piston 274 is moved away from the rotating conical brake shoe 271. This movement of the linearly sliding brake piston 274 within the chamber 275 causes the lower tapered surface 276 of the linearly sliding brake piston 274 to move out of engagement with the friction material 273 which encircles the rotating conical brake shoe 271. Without contact between the lower tapered surface 276 of the linearly sliding brake piston 274 and the friction material 273, the rotating conical brake shoe 271 and thus the cable drum 208 are free to rotate. In the event of a loss of air pressure, the spring 277 moves the linearly sliding brake piston 274 back through chamber 275, thus causing its lower tapered surface 276 to engage the rotating conical brake shoe 271, which prevents further rotation of the cable drum 208. Proper linear travel of the brake piston 274 through the chamber 275 is assured by causing it to move along a guide pin 278. Two seals 279 assure that gas pressure P moves the brake piston 274 through its chamber 275. By utilization of such an air pressure released braking system the balancing hoist of the present invention operates in a manner similar to a conventional hoist.

Figure 9:
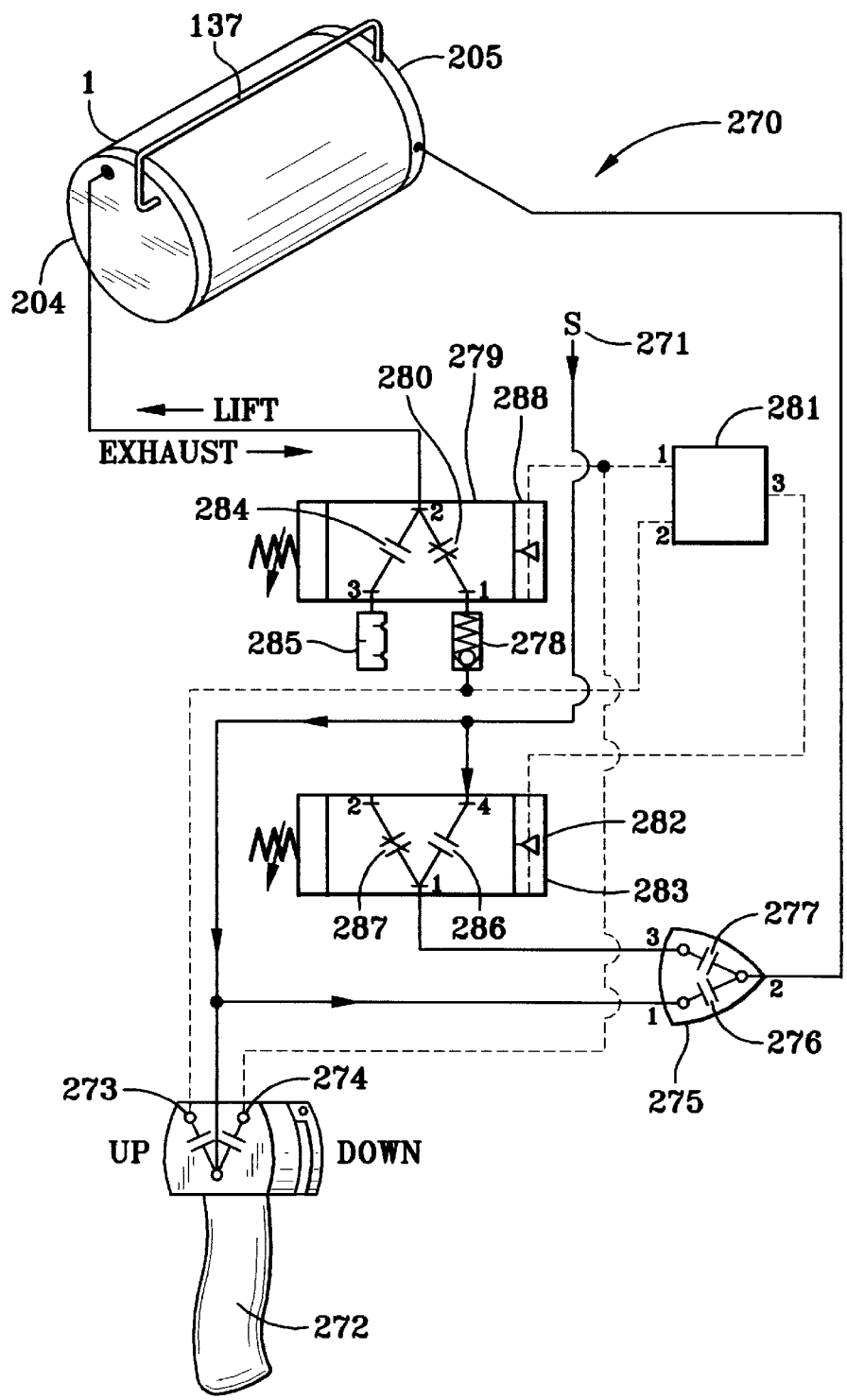
FIG. 9 is a schematic of the pneumatic circuit controlling the operation of the second alternate embodiment shown in FIG. 8.

FIG. 9 is a schematic diagram of the pneumatic control system 270 for the second embodiment of the invention depicted in FIG. 8. The purpose of this pneumatic control system is to allow the hoist to act as either a balancing hoist or a regular hoist. As a balancing hoist such as described in U.S. Pat. No. 5,522,581, there is no braking force applied to the rotating cable drum 208 before the cable drum 208 turns. As a regular hoist, there is braking force applied to the rotating cable drum 208 before the cable drum 208 turns. Selection to operate the unit either as a balancing hoist or as a regular hoist is made by positioning the control on the selector switch 275. Once the control has been positioned either in the balancing hoist position 276 or in the regular hoist position 277, the hoist may be operated with the hand control 272 to move the load either up by depressing the "up" button 273 or down by depressing the "down" button 274. The position of the control on the selector switch 275 and the selection of either the "up" button 273 or the "down" button 274 controls the gas flow within the pneumatic circuit. This gas flow controls the positioning of both pilot-operated switching valves 282 and 279. A better understanding of the gas flow through the pneumatic circuit may be had by reference to the following diagrams which describe gas flow through the pneumatic circuit during the various modes of hoist operation.

Figure 9A:
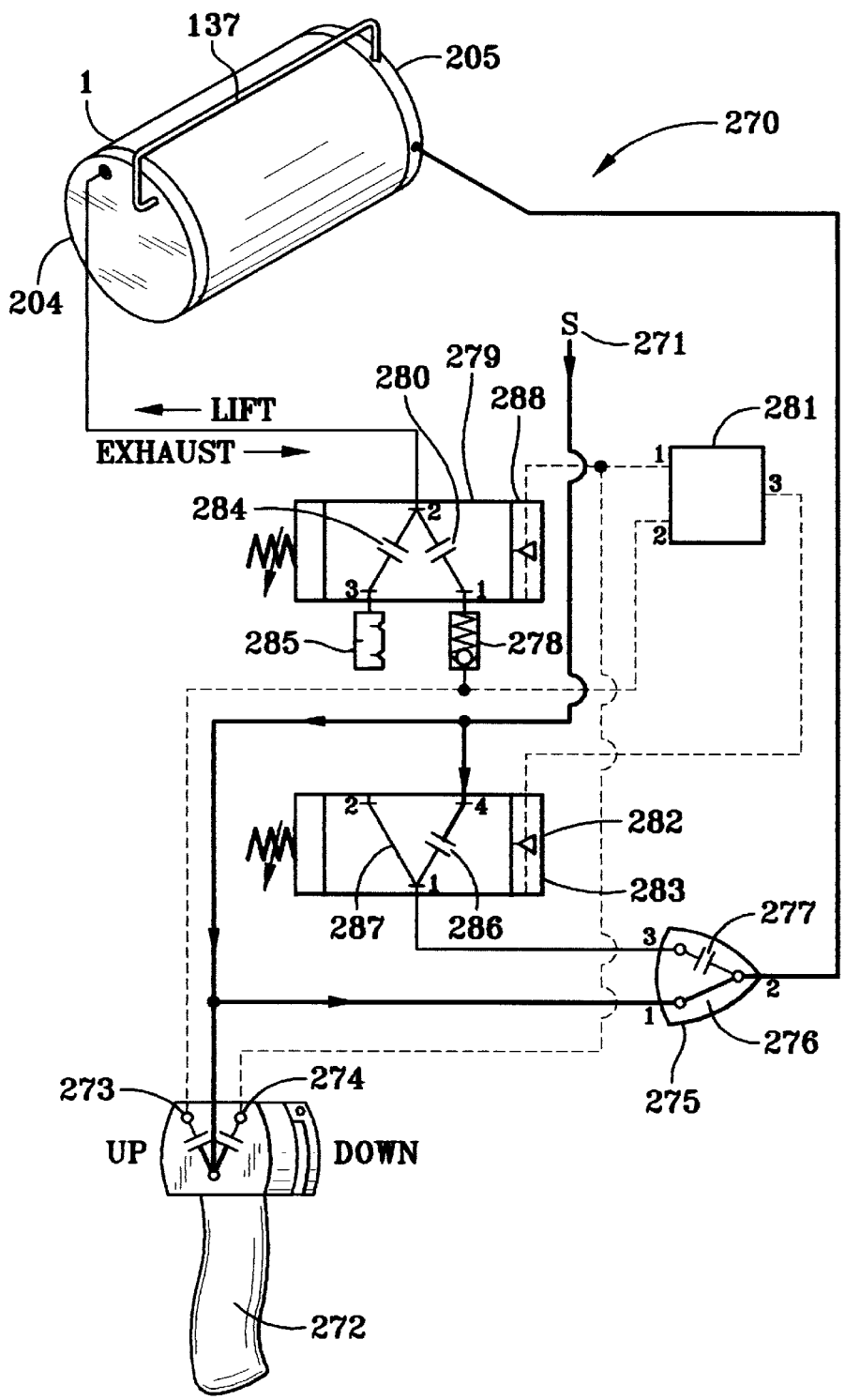
FIGS. 9A through 9F are schematic diagrams illustrating the various operating conditions of the pneumatic circuit shown in FIG. 9.

In FIG. 9A, the hoist is operated as a balancing hoist. Therein, it may be seen that pressurized gas from supply 271 is conducted to the pilot operating switching valve 282, where its flow path is blocked. Gas flow continues on to the control handle 272 where again the flow path is blocked. The only open flow path is through path 1-2, 276 in the selector switch 275. This open-flow path allows the pressurized gas to enter the end wall 205 and release the rotating conical brake shoe 271 which controls the rotation of the cable drum 208. The switch valve 282 is shuttled to where gas flows through path 1-2, 287 in the switch valve 282.

Figure 9B:
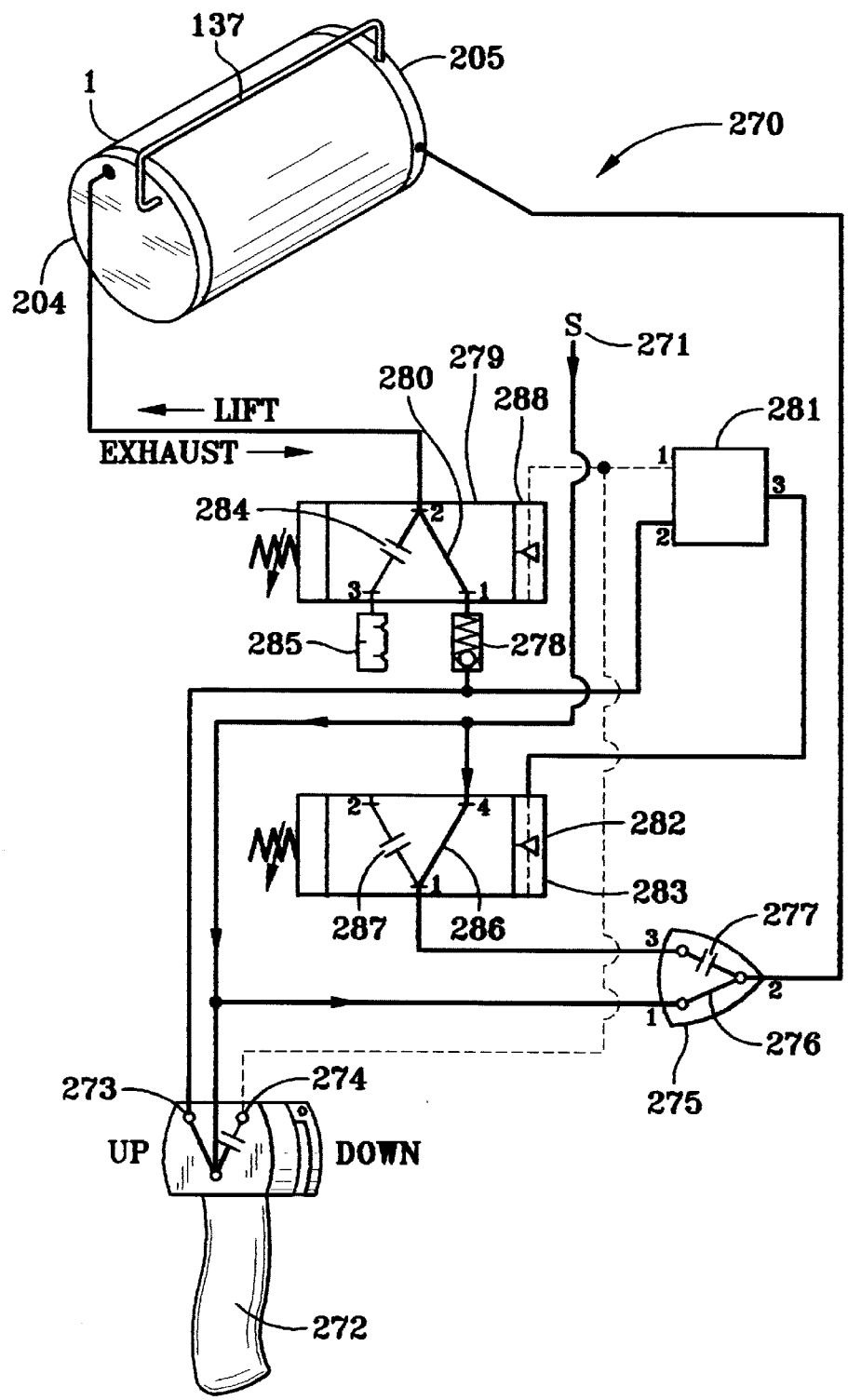

In FIG. 9B, the system is again in the balancing hoist mode. In this configuration, it is now desired to lift a load. Therefore, pressurized gas must be supplied to the piston 214 to cause it to move through the housing 240. Herein, pressurized gas flows from the supply 271 to the control handle 272, and thence through the "up" control 273, through the check valve 278, on through path 1-2, 280 of the pilot-operated switch valve 279 and into the end wall 204. Pressurized gas also continues through the OR valve 281 and on to the shuttle control 283 for the pilot-operated switch valve 282. This positioning of the pilot-operated switch valve 282 conducts gas through path 1-4, 286 of the switch valve 282 to selector switch 275 where flow is blocked at path 277. It should also be noted that gas from supply 271 passes through path 1-2, 276 of the selector switch 275, and thence into the end wall 205 where it releases the rotating conical brake shoe 271.

Figure 9C:
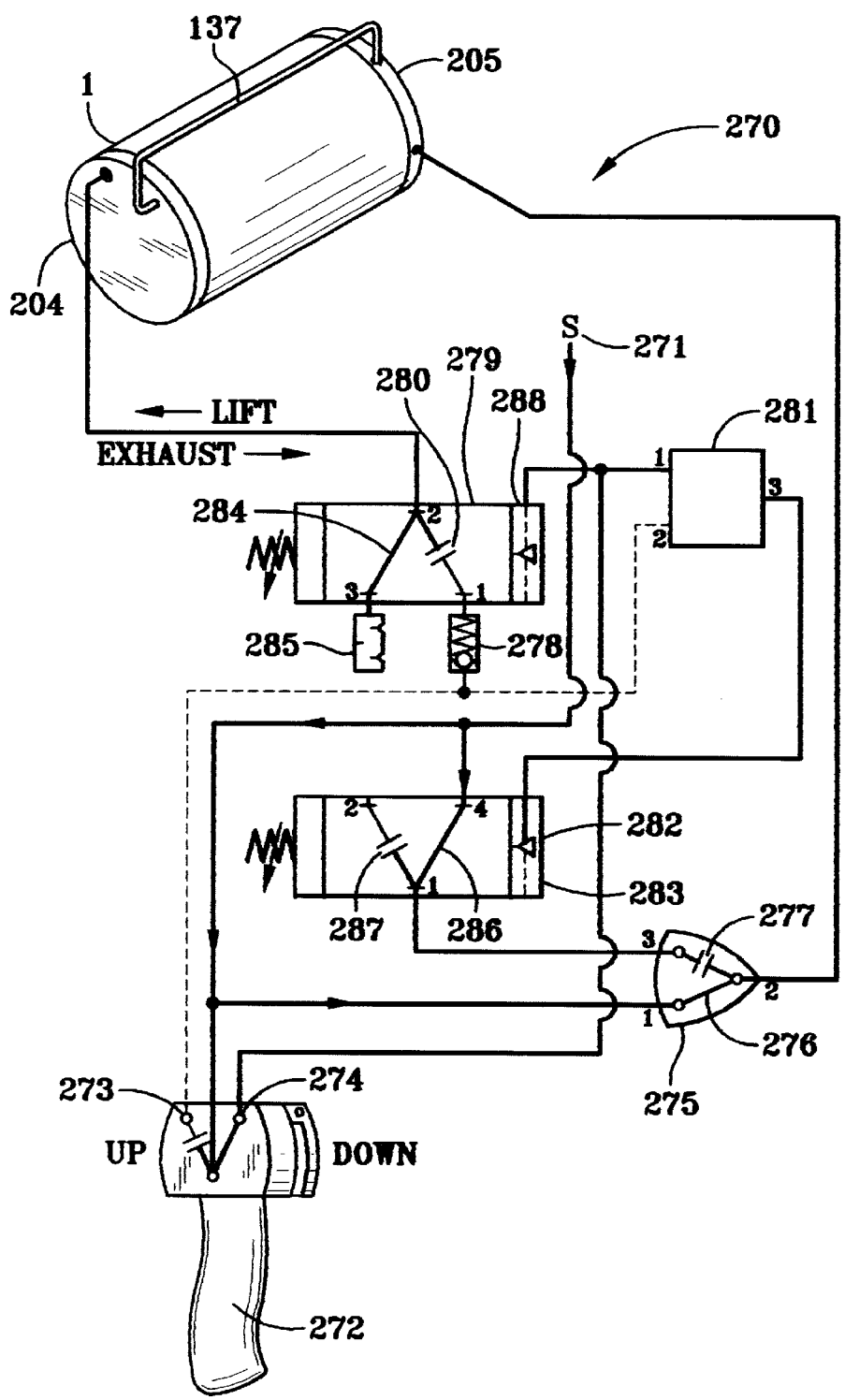

In FIG. 9C, the "down" button 274 is pressed while the hoist is in its balancing hoist mode. Therefore, a path must be provided for the gas to travel out of the housing 240. This path is provided by the open path 2-3, 284 in the pilot-operated shuttle valve 279. Gas exits the system through a muffler 285. In order to assure that the rotating conical brake 271 within the end wall 205 is released, gas passes through path 1-2, 276 in the selector switch 275. Proper positioning of both pilot-operated switch valves 279 and 282 is provided by gas from the OR valve 281 to both shuttle controls 283 and 288 for the switch valves 282 and 279, respectively.

Figure 9D:
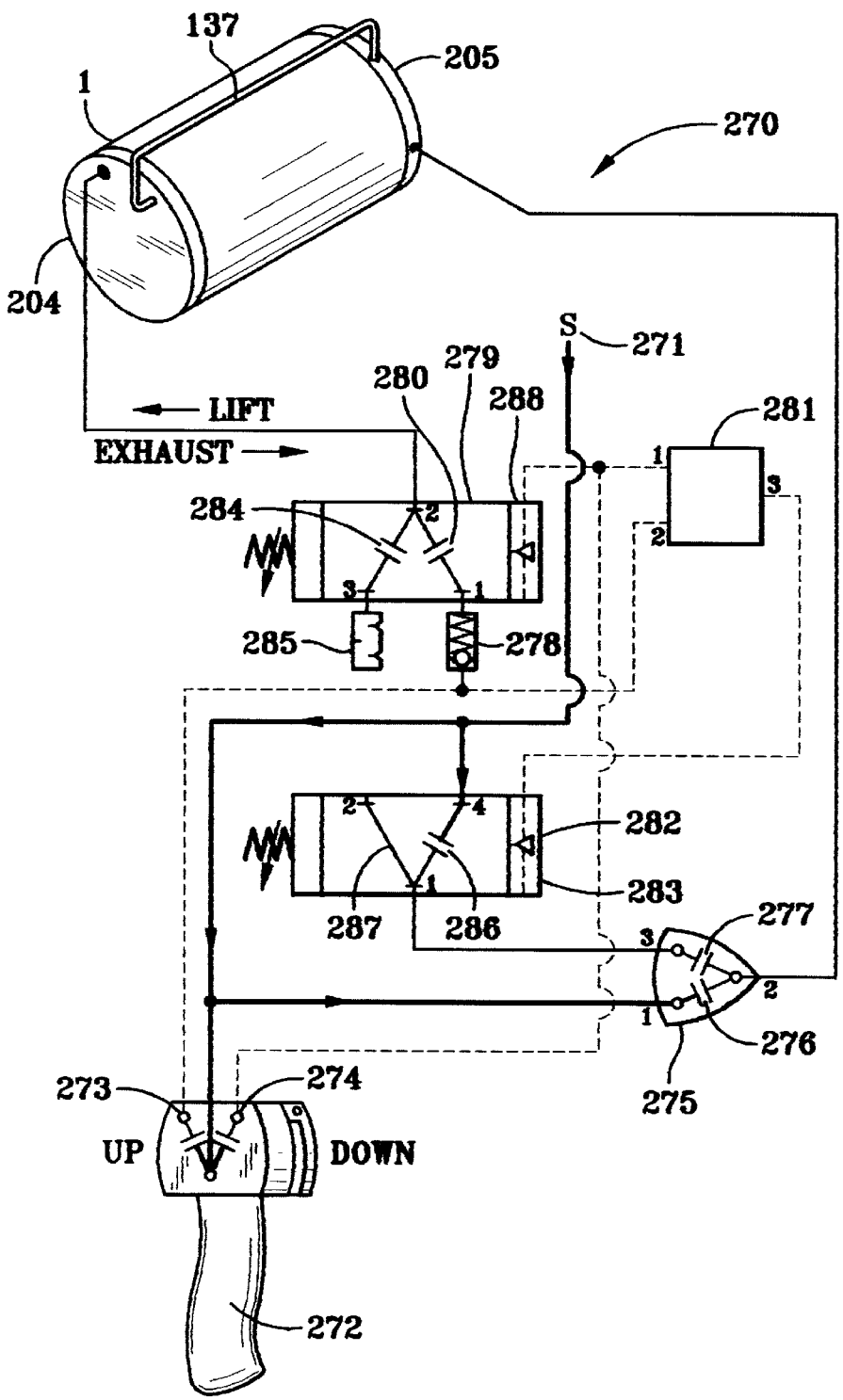

In FIG. 9D, the system is operated in its normal hoist mode. Thus, no pressurized gas is supplied to the rotating conical brake shoe 271 within the end wall 205. This allows the spring 277 to move the brake pistons 274 into engagement with friction material 273 on the rotating conical brake shoe 271. The flow of pressurized gas is from the source 271 to the control handle 272. As all other paths for the flow of pressurized gas are blocked, no gas is provided to the hoist assembly.

Figure 9E:
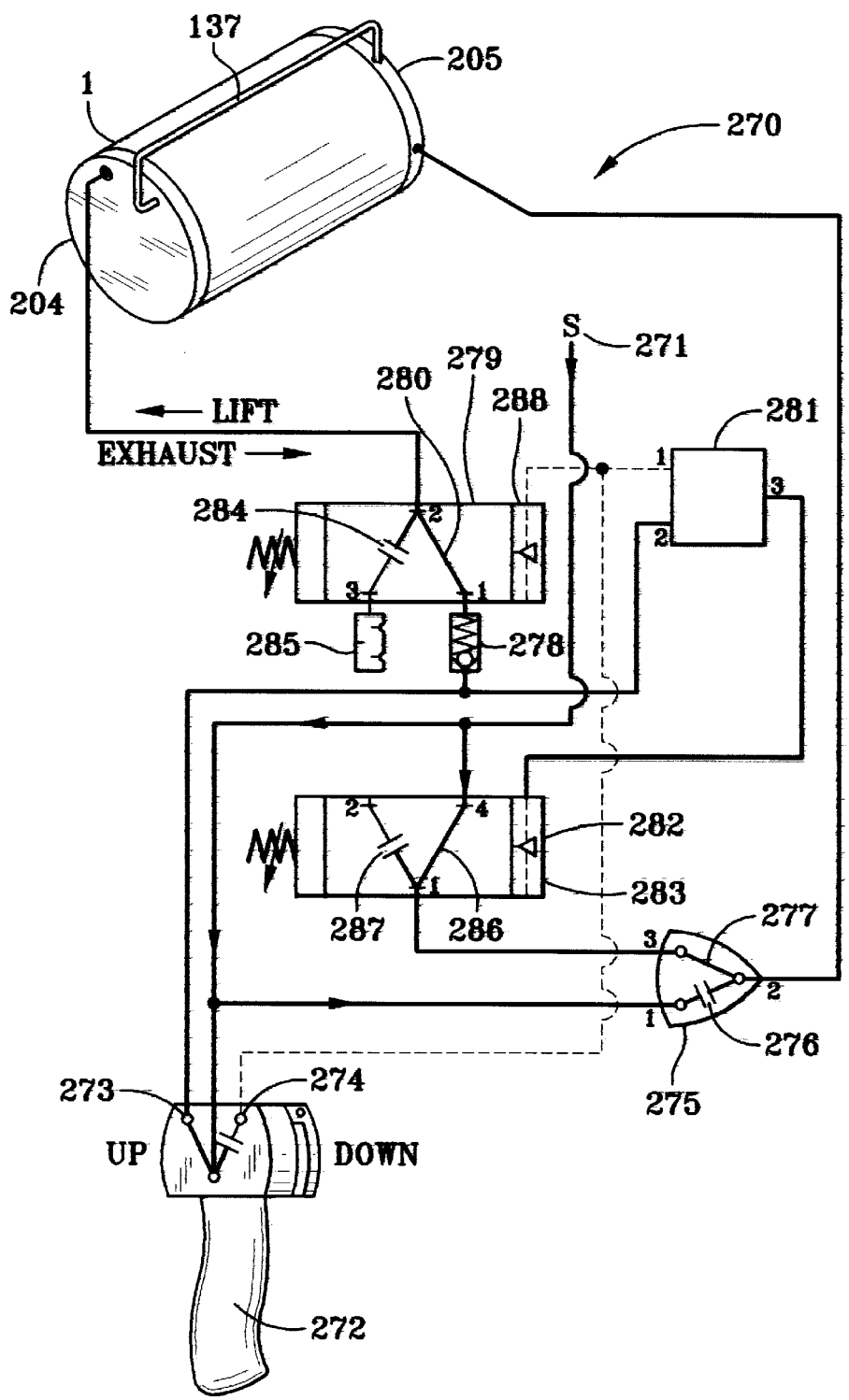

In FIG. 9E, it is desired to raise the load with the hoist operating in its normal mode. Therein, it may be seen that gas is provided from the source 271 through the control handle 272, thence through the "up" switch 273 through the check valve 278 and on to end the wall 204. This causes the piston 214 to move longitudinally through the housing 240, thus causing the cable drum 208 to rotate and lift the load. In order for the cable drum 208 to rotate, the rotating conical brake shoe 271 must be released. This is accomplished by providing gas to the end wall 205. Pressurized gas flows through path 4-1, 286 of the switching valve 282, thence through path 3-2, 277 of the selector switch 275. Additional gas flows through the OR valve 281 to set the shuttle controls 283 and 288 of the switching valve 282 and 279, respectively.

Figure 9F:
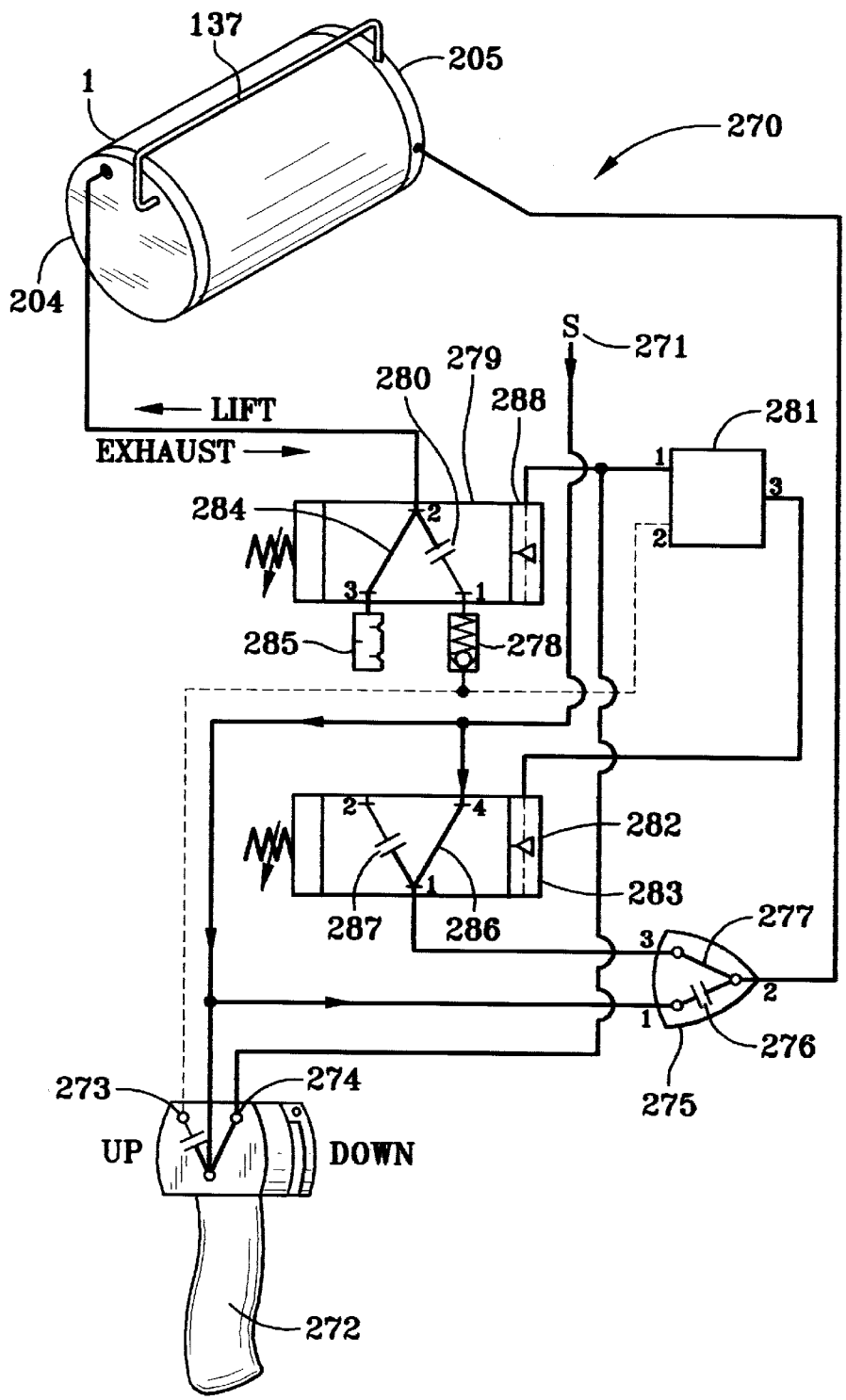

In FIG. 9F, it is now desired to let the load down with the hoist in its normal operating mode. Exit gas from the hoist passes through path 2-3, 284 in the switching valve 279 and thence out through the muffler 285. Pressurized gas also passes through path 1-4, 286 of the switching valve 282. This allows for passage of gas through path 3-2, 277 in the selector switch 275 and on to the end wall 205. Gas also passes through the OR valve 281, which assures proper positioning of both switch valves 282 and 279.

Another embodiment of this invention involves the use of this invention in various material handling systems that incorporate well known materials handling elements of rail and trolleys. For example, as shown in FIG. 1, the balancing hoist can be moved through or about a facility by the movement of a trolley 2 on some means for supporting the balancing hoist such as an overhead rail 32. In FIG. 1, the overhead rail 31 is an I-beam rail, which is well known in the art. Similar means for movement of a trolley are well known in the art of materials handling. These material handling systems allow the movement of work pieces and equipment around the work space for use in an industrial process. Generally, there are two types of rail systems: (1) single rail or monorail systems; and (2) dual rail systems. FIG. 1 shows the means of moving the balancing hoist through the use of a single trolley on one beam or support. Single rail systems, or monorail systems, would similarly function like the overhead support shown in FIG. 1. Single rail systems involve the use of one rail to move the various work pieces by rolling the wheels of the trolley and in turn the balancing hoist along the rail. A dual rail system allows for the use of a carriage or bridge, which can be connected to the balancing hoist. The carriage and bridge move on the rails by use of trolleys mounted on the carriage. It should be noted that facilities can also easily employ the use of precision rail overhead conveyance systems with rails having shapes other than the I-beam rail shown in FIG. 1. These various rail systems are well known in the art and commercially available from Zimmerman International Corp. located in Madison Heights, Mich. Thus, material handling systems can incorporate the balancing hoists disclosed herein. A "facility" shall refer to any industrial, manufacturing, fabricating, warehousing, processing, or repairing facility in any field of application in which it is necessary to transport, manipulate, or move work pieces or finished products. In short, a facility is any location at which it is necessary to employ materials handling equipment to transport, manipulate, or move work pieces such as an automotive plant, a product warehouse, or equipment manufacturing plant.

Although several embodiments of the invention are illustrated and described in detail, it will be understood that the invention is not limited merely to the embodiments described herein, but contemplates other embodiments and variations that utilize the concepts and teachings of this invention.

Having thus described the invention, we claim:

1. A balancing hoist for raising and lowering loads comprising:

a hollow housing and two end walls forming a chamber, said housing further including an inlet for the passage of pressurized gas into said chamber;

a piston slidably positioned within said chamber;

a rotatable cable drum located within said housing, said rotatable cable drum being movable longitudinally within said housing together with said piston, said rotatable cable drum containing at least one longitudinal opening;

stationary means within said housing for rotatably supporting said rotatable cable drum, said rotatable cable drum being caused to rotate when said piston and said rotatable cable drum are moved together longitudinally within said housing;

a cable affixed to said rotatable cable drum such that said cable is wound and unwound about said rotatable cable drum when raising and lowering loads;

at least one rod means which slidably and longitudinally engages said rotatable cable drum through said at least one longitudinal opening;

a flywheel fixedly connected to said at least one rod means and adjacent to one of said end walls, said flywheel being coaxial with said means for rotatably supporting said rotatable cable drum;

a braking mechanism mounted on said flywheel, said braking mechanism being activated when the rotation of said rotatable cable drum exceeds a predetermined speed said braking mechanism will stop the rotation of said rotatable cable drum; and mechanical locking means mounted on said flywheel, said mechanical locking means being activated when the passage of pressurized gas into said chamber is interrupted.

2. The balancing hoist for raising and lowering loads as defined in claim 1, wherein said breaking mechanism further includes:

at least one brake shoe pivotably mounted on said flywheel;

a spring connected to both said flywheel and said at least one brake shoe such that said spring restrains said at least one brake shoe in a radially inward position against radial movement outward until the rotation of said rotatable cable drum exceeds a predetermined speed; and a braking surface within said housing for contacting with said at least one brake shoe.

3. The balancing hoist as defined in claim 2, wherein said end wall located adjacent said flywheel includes said braking surface for contacting said at least one brake shoe.

4. The balancing hoist as defined in claim 2 wherein the tension of said spring is adjustable.

5. A balancing hoist for raising and lowering loads comprising:

a housing forming a chamber, said housing further including a manifold for the passage of pressured gas into said chamber;

a piston slidably positioned within said chamber, said piston being movable within said chamber in response to the pressurized gas in response to said pressurized gas within said chamber;

a rotatable cable drum located within said housing, said rotatable cable drum being movable longitudinally within said housing together with said piston, said rotatable cable drum containing at least one longitudinal opening;

a stationary ball screw mounted axially within said housing, said stationary ball screw rotatably supporting said rotatable cable drum, said rotatable cable drum being caused to rotate by threadable engagement with said stationary ball screw when said piston and said cable drum are moved together longitudinally within said housing;

a cable affixed to said rotatable cable drum such that said cable is wound and unwound about said rotatable cable drum when raising and lowering loads;

at least one rod means slidably engaging said rotatable cable drum, said at least one rod means longitudinally aligned with said stationary ball screw;

a flywheel fixedly connected to said at least one rod means and concentrically aligned with said stationary ball screw;

at least one brake shoe pivotably mounted to said flywheel; and a spring mounted on said flywheel and connected to said at least one brake shoe such that said spring restrains said at least one brake shoe against outward radial movement outward until the rotational speed of said rotatable cable drum exceeds a predetermined speed;

a braking surface within said housing for contacting with said at least one brake shoe;

mechanical locking means mounted on said flywheel, said mechanical locking means being activated when the passage of pressurized gas into said chamber is interrupted.

6. A balancing hoist for raising and lowering loads comprising:

a hollow housing and two end walls forming a chamber, said chamber further including an inlet for the passage of pressurized gas into said chamber;

a piston movable by said pressurized gas slidably positioned within said chamber;

a rotatable cable drum located within said housing, said rotatable cable drum being movable longitudinally within said housing together with said piston, said rotatable cable drum containing at least one longitudinal opening;

stationary means within said housing for rotatably supporting said rotatable cable drum, said rotatable cable drum being caused to rotate when said piston and said cable drum are moved together longitudinally within said housing;

a cable affixed to said rotatable cable drum such that said cable is wound and unwound about said rotatable cable drum when raising and lowering loads;

at least one rod means which slidably and longitudinally engages said rotatable cable drum through at least one longitudinal opening;

a flywheel fixedly connected to said at least one rod means and adjacent to one of said end walls, said flywheel being coaxial and with said means for rotatably supporting said rotatable cable drum;

a braking mechanism mounted on said flywheel such that when the rotation of the cable drum exceeds a predetermined speed, said braking mechanism will stop the rotation of said rotatable cable drum;

a brake disc having a plurality of detent holes formed therein mounted adjacent to said flywheel;

a spring activated detent pin constructed and arranged to pass through one of said detent holes in the event of an interruption in the passage of pressurized gas into said chamber.

7. The balancing hoist for raising and lowering load as defined in claim 6, wherein said braking mechanism further includes:

at least one brake shoe pivotably mounted on said flywheel;

a spring connected to both said flywheel and said at least one brake shoe such that said spring restrains at least one brake shoe in a radially inward position against radial movement outward until the rotation of said rotatable cable drum exceeds a predetermined speed; a braking surface within said housing for contacting with said at least one brake shoe.

8. The balancing hoist as defined in claim 7, wherein said end wall located adjacent said housing with said flywheel includes said braking surface.

9. The balancing hoist as defined in claim 7, wherein the tension of said spring is adjustable.

10. A balancing hoist for raising and lowering loads comprising:

a housing forming a chamber, said housing further including a manifold for the passage of pressurized gas into said chamber.

a piston movable by said pressurized gas, said piston slidably positioned within said chamber;

a rotatable cable drum located within said housing, said rotatable cable drum being movable longitudinally within said housing together with said piston, said rotatable cable drum containing at least one longitudinal opening;

a stationary ball screw mounted axially within said housing, said stationary ball screw rotatably supporting said rotatable cable drum, said rotatable cable drum being caused to rotate by threadable engagement with said stationary ball screw when said piston and said rotatable cable drum are moved together longitudinally within said housing;

a cable affixed to said rotatable cable drum such that when said cable is wound and unwound about said rotatable cable drum when raising and lowering loads;

at least one rod means slidably engaging said rotatable cable drum, said at least one rod means longitudinally aligned with said stationary ball screw;

a flywheel fixedly connected to said at least one rod means, said flywheel being concentrically aligned with said stationary ball screw;

at least one brake shoe pivotably mounted to said flywheel;

a spring mounted on said flywheel and connected to said at least one brake shoe such that said spring restrains said at least one brake shoe against outward radial movement outward until the rotational speed of said rotatable cable drum exceeds a predetermined speed;

a braking surface within said housing for contacting with said at least one brake shoe;

a brake disc having a plurality of detent holes form therein mounted adjacent to said flywheel;

a spring activated detent pin constructed and arranged to pass through one of said detent holes in the event of an interruption in the passage of pressurized gas into said chamber.

* * * * *